United States Patent
Ohana et al.

(10) Patent No.: US 7,571,331 B2
(45) Date of Patent: Aug. 4, 2009

(54) MEANS FOR PREVENTING UNINTENDED POWERING OF A FIRST POWER OVER ETHERNET CONTROLLER

(75) Inventors: Eli Ohana, Kfar Sava (IL); Shimon Elkayam, Milton (GB)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 625 days.

(21) Appl. No.: 11/379,790

(22) Filed: Apr. 23, 2006

(65) Prior Publication Data

US 2006/0181817 A1    Aug. 17, 2006

Related U.S. Application Data

(63) Continuation-in-part of application No. 11/045,288, filed on Jan. 31, 2005, now Pat. No. 7,281,141.

(60) Provisional application No. 60/676,307, filed on May 2, 2005.

(51) Int. Cl.
    *G06F 1/28*    (2006.01)
(52) U.S. Cl. .......................... 713/300; 714/47
(58) Field of Classification Search .................. 713/300; 714/47
    See application file for complete search history.

(56) References Cited

U.S. PATENT DOCUMENTS

| 6,473,608 | B1 | 10/2002 | Lehr et al. |
| 6,643,566 | B1 | 11/2003 | Lehr et al. |
| 2004/0260794 | A1* | 12/2004 | Ferentz et al. .............. 709/220 |
| 2007/0019445 | A1* | 1/2007 | Blaha et al. .............. 363/21.12 |

OTHER PUBLICATIONS

IEEE-802.3af-2003; Jun. 18, 2003; The Institute of Electrical and Electronics Engineers, N.Y.

* cited by examiner

*Primary Examiner*—Chun Cao
*Assistant Examiner*—Albert Wang
(74) *Attorney, Agent, or Firm*—Simon Kahn

(57) ABSTRACT

Power sourcing equipment comprising: a power input; an output port; a control circuit comprising a means for sensing that a voltage component of power received at the power input is above a pre-determined threshold; a non-uniform signal source; an impedance associated with the non-uniform signal source; and an electronically controlled switch responsive to the control circuit, the electronically controlled switch being arranged to switchably operatively connect the impedance to at least momentarily be seen across the output port; the control circuit being operative responsive to an output of the means for sensing to operatively connect the impedance via the operation of the electronically controlled switch; the electronically controlled switch being operative to disconnect the impedance from being seen across the output port in the absence of the indicative output.

23 Claims, 7 Drawing Sheets

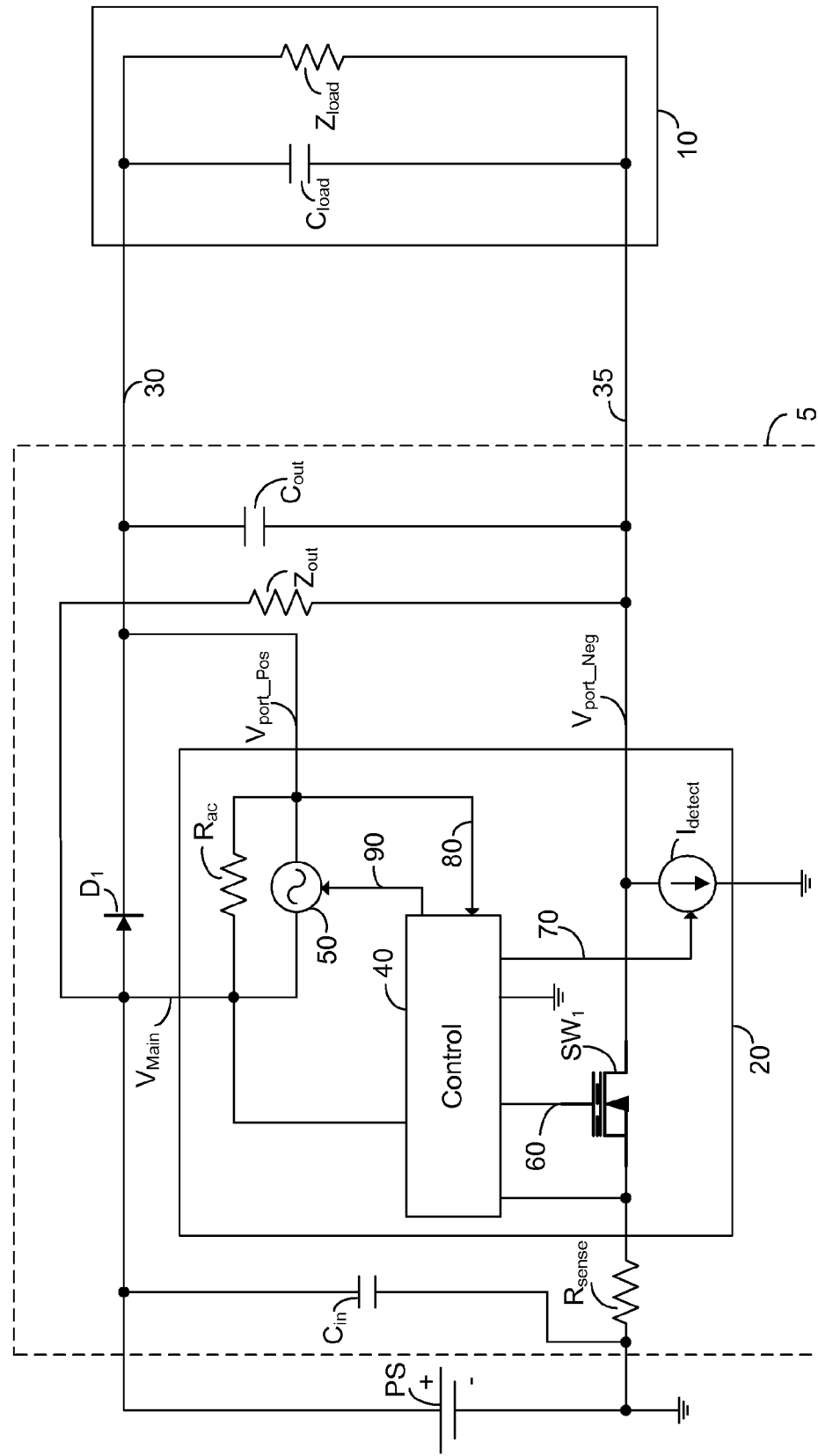
Fig. 1A *Prior Art*

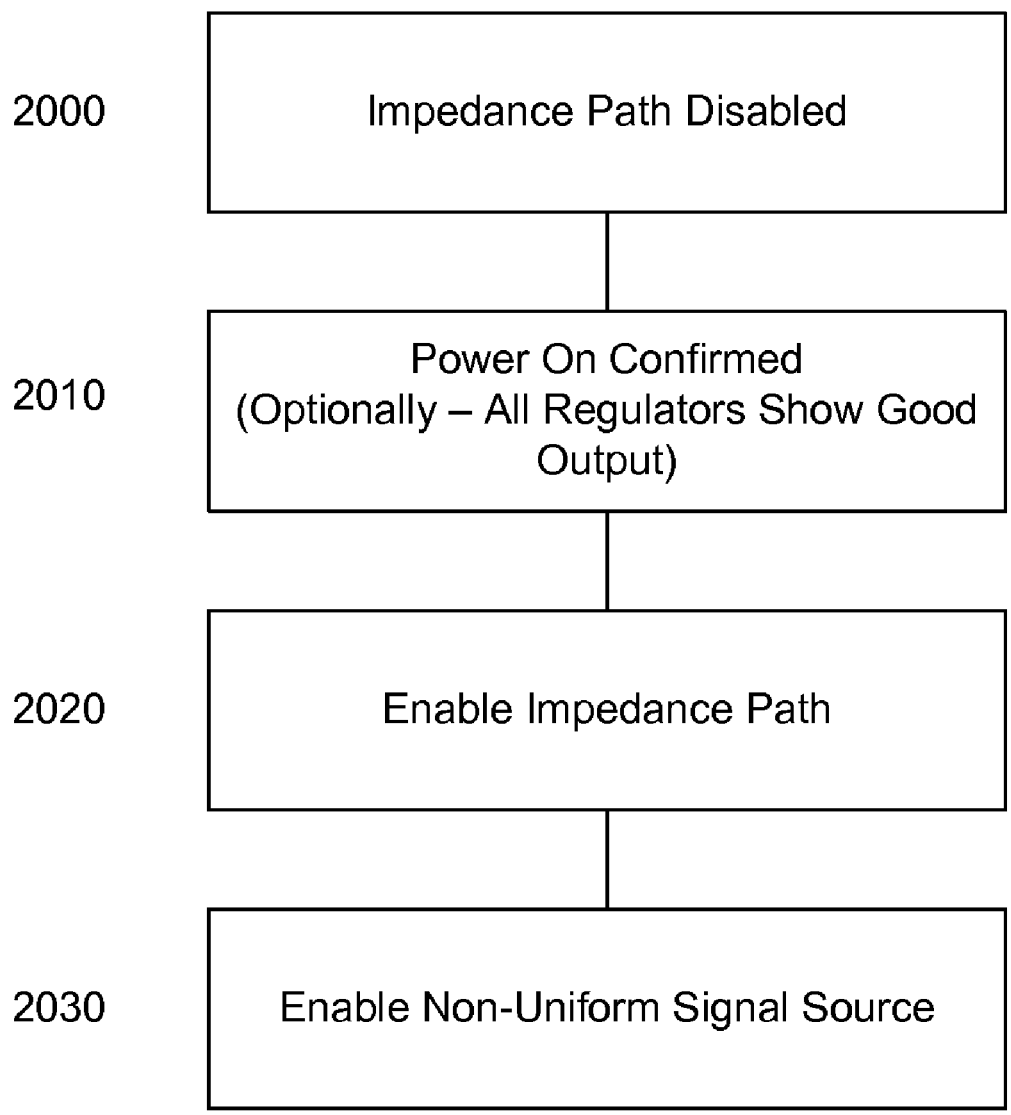

MEANS FOR PREVENTING UNINTENDED POWERING OF A FIRST POWER OVER ETHERNET CONTROLLER

CROSS-REFERENCE TO RELATED APPLICATIONS

This application claims priority from U.S. Provisional Patent Application Ser. No. 60/676,307 filed May 2, 2005 entitled "Means for Preventing Unintended Powering", and is a continuation in part of U.S. patent application Ser. No. 11/045,288 filed Jan. 31, 2005 now U.S. Pat. No. 7,281,141 entitled "Preventing Excess Port Voltage During Disconnect", the entire contents of both of which are incorporated herein by reference.

BACKGROUND OF THE INVENTION

The present invention relates to the field of power over Ethernet, and more particularly to power sourcing equipment having an impedance populated path between an output port and a power input which is disabled in the absence of input power.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

Several patents addressed to this issue exist including: U.S. Pat. No. 6,473,608 issued to Lehr et al., whose contents are incorporated herein by reference and U.S. Pat. No. 6,643,566 issued to Lehr et al., whose contents are incorporated herein by reference. Furthermore a standard addressed to the issue of powering remote devices over an Ethernet based network has been published as IEEE 802.3af-2003, whose contents are incorporated herein by reference.

An Ethernet switch or midspan module providing power over Ethernet (POE) functionality is typically designed to support a plurality of ports, and power is preferably to be supplied to compatible equipment after detection. Detection is accomplished by impressing two distinct known voltage levels via a known impedance on the device to be detected and measuring the resultant port voltages. A resistive signature of the device is determined as a result of the measured port voltages. A pre-determined signature resistance, preferably of between 19 Kohm and 26.5 Kohm, is indicative of a device to be powered. Unfortunately if the device meets the criteria of the resistive signature it will be powered irrespective of whether the device is designed to receive power over the Ethernet cabling. Furthermore, certain legacy devices require other signatures for detection. In particular, a pre-standard capacitor detection is known to the prior art, and in the event that the device meets the pre-standard detection power may be supplied irrespective of whether the device is designed to receive power over the Ethernet cabling.

Power is typically supplied under control of a POE controller, the POE controller energizing for each port to be powered an electronically controlled switch, which in an exemplary embodiment comprises a power MOSFET. In another embodiment the electronically controlled switch comprises a FET or bipolar transistor. In order to reduce cost and minimize the footprint, preferably the required electronically controlled switches are provided embedded within the POE controller. In another embodiment the required electronically controlled switches are provided external to the POE controller, and are responsive to an output of the POE controller.

After powering a port for which a valid attached powered device has been detected, the port is monitored for a valid maintain power signature (MPS). The above mentioned standard describes two MPS components; an AC MPS component and a DC MPS component. The POE controller may optionally monitor the AC MPS component, the DC MPS component or both the AC and the DC MPS components. Implementation of the AC MPS component requires an AC signal source to be connected to the port. The term AC signal source is meant to be a general term, indicative of a non-uniform signal, herein impressed onto a DC signal. In the event that the POE controller detects an absence of a valid monitored MPS component power to the port is to be disconnected. Preferably, disconnection is to occur within 300-400 ms of the dropout of a valid monitored MPS component.

FIG. 1A illustrates a high level schematic diagram of a first embodiment of a POE system arranged to monitor an AC MPS component for disconnection of a powered device according to the prior art. The POE system of FIG. 1A comprises a power sourcing equipment (PSE) 5; a powered device (PD) 10; a first twisted pair 30; a second twisted pair 35; and a power source PS. PD 10 presents a capacitance and a load schematically represented as $C_{load}$ and $Z_{load}$. PSE 5 comprises a POE controller 20; a sense resistor $R_{sense}$; a unidirectional current means $D_1$; an output impendence $Z_{out}$; an output capacitor $C_{out}$; and an input capacitor $C_{in}$. POE controller 20 exhibits an output port between terminals designated $V_{port\_Pos}$ and $V_{port\_Neg}$ and comprises a control circuit 40; an AC signal source 50; an AC signal source resistance $R_{ac}$; an electronically controlled switch $SW_1$; a detection source $I_{detect}$; a control means 60; a control means 70; a sensing input 80; and a control means 90.

Electronically controlled switch $SW_1$ is illustrated as a power MOSFET, however this is not meant to be limiting in any way. $SW_1$ may be implemented as a FET or bipolar transistor without exceeding the scope of the invention. Detection source $I_{detect}$ is illustrated as being a variable current source, however this is not meant to be limiting in any way. Detection source $I_{detect}$ may be implemented as a voltage source or as a plurality of current sources without exceeding the scope of the invention. Twisted pairs 30 and 35 form part of a single structured communication cabling. $C_{load}$ and $Z_{load}$ schematically represent the input capacitance and load, respectively, of PD 10 which is to be detected and powered by PSE 5. In an exemplary embodiment $Z_{out}$ comprises a 45.3 K resistor, $C_{out}$ comprises a 0.2 µf capacitor and $C_{in}$ is typically on the order of 22-47 µf. AC signal source 50 is illustrated herein as a current source, and is a particular example of a general non-uniform signal source. Unidirectional current means $D_1$ typically comprises a Zener diode with a breakdown voltage of approximately 10 volts.

Switch $SW_1$ is illustrated as being internal to POE controller 20, typically as part of a single integrated circuit, however this is not meant to be limiting in any way. Switch $SW_1$ may be implemented externally to POE controller 20 without exceeding the scope of the invention. Control means 60 may be a direct output of control circuit 40 or a circuit responsive thereto without exceeding the scope of the invention.

The positive output of power source PS is connected to the anode of unidirectional current means $D_1$, a first end of $Z_{out}$, a first end of $C_{in}$, and via a terminal designated $V_{Main}$ to the input of AC signal source 50, a first end of $R_{ac}$ and control circuit 40. The cathode of unidirectional current means $D_1$ is connected to a first end of $C_{out}$, control circuit 40 via sensing input 80 connected to terminal $V_{port\_Pos}$, a second end of $R_{ac}$, the output of AC signal source 50 and a first end of first twisted pair 30. The control input of AC signal source 50 is connected to control circuit 40 via control means 90. The control input of detection source $I_{detect}$ is connected to an output of control circuit 40 via control means 70. The gate of electronically controlled switch $SW_1$ is connected to an output of control circuit 40 via control means 60. The negative output of power source PS is connected to ground, a second end of $C_{in}$ and a first end of $R_{sense}$. A second end of $R_{sense}$ is connected to an input of control circuit 40 and to the drain of $SW_1$. The source of $SW_1$ is connected to one end of detection source $I_{detect}$, to a second end of $Z_{out}$ via terminal $V_{port\_Neg}$, a second end of $C_{out}$ and a first end of second twisted pair 35. The return of detection source $I_{detect}$ is connected to ground. A second end of first twisted pair 30 is connected to a first end of $Z_{load}$ and a first end of $C_{load}$. A second end of $Z_{load}$ and a second end of $C_{load}$ are connected to a second end of second twisted pair 35.

In operation control circuit 40 operates detection source $I_{detect}$ through control means 70 to generate a plurality of current levels. The plurality of current levels flow through $Z_{load}$, if connected, thereby presenting a plurality of voltages sensed at sensing input 80. After detection and classification of a valid PD 10, control circuit 40 connects power from power source PS over first and second twisted pairs 30,35 by the operation of electronically controlled switch $SW_1$ via control means 60. AC signal source 50, operated via control means 90, supplies an AC MPS which is sensed at sensing input 80. Among other functions, unidirectional current means $D_1$ prevents the attenuation of the output of AC signal source 50 by blocking a connection to power source PS. Upon detection of the absence of a valid MPS, control circuit 40 operates control means 60 to open electronically controlled switch $SW_1$ thereby disabling power to PD 10.

FIG. 1B illustrates a high level schematic diagram of a second embodiment of a POE system arranged to monitor an AC MPS component for disconnection of a PD according to the prior art. The POE system of FIG. 1B comprises a PSE 5; a PD 10; a first twisted pair 30; a second twisted pair 35; and a power source PS. PD 10 presents a capacitance and a load schematically represented as $C_{load}$ and $Z_{load}$. PSE 5 comprises a POE controller 20; a sense resistor $R_{sense}$; a unidirectional current means $D_1$; an output impendence $Z_{out}$; an output capacitor $C_{out}$; and an input capacitor $C_{in}$. POE controller 20 exhibits an output port between terminals designated $V_{port\_Pos}$ and $V_{port\_Neg}$ and comprises a control circuit 40; an AC signal source 55; an AC signal source resistance $R_{ac}$; an electronically controlled switch $SW_1$; a detection source $I_{detect}$; a control means 60; a control means 70; a sensing input 80; and a control means 90.

Electronically controlled switch $SW_1$ is illustrated as a power MOSFET, however this is not meant to be limiting in any way. $SW_1$ may be implemented as a FET or bipolar transistor without exceeding the scope of the invention. Detection source $I_{detect}$ is illustrated as being a variable current source, however this is not meant to be limiting in any way. Detection source $I_{detect}$ may be implemented as a voltage source or as a plurality of current sources without exceeding the scope of the invention. Twisted pairs 30 and 35 form part of a single structured communication cabling. $C_{load}$ and $Z_{load}$ schematically represent the input capacitance and load, respectively, of PD 10 which is to be detected and powered by PSE 5. In an exemplary embodiment $Z_{out}$ comprises a 45.3 K resistor, $C_{out}$ comprises a 0.2 µf capacitor and $C_{in}$ is typically on the order of 22-47 µf. AC signal source 55 is illustrated herein as a voltage source, and is a particular example of a general non-uniform signal source.

Switch $SW_1$ is illustrated as being internal to POE controller 20, typically as part of a single integrated circuit, however this is not meant to be limiting in any way. Switch $SW_1$ may be implemented externally to POE controller 20 without exceeding the scope of the invention. Control means 60 may be a direct output of control circuit 40 or a circuit responsive thereto without exceeding the scope of the invention.

The positive output of power source PS is connected to the anode of unidirectional current means $D_1$, a first end of $C_{in}$, a first end of $Z_{out}$, and via a terminal designated $V_{Main}$ to a first end of AC signal source 55 and control circuit 40. The cathode of unidirectional current means $D_1$ is connected to a first end of $C_{out}$, control circuit 40 via sensing input 80 connected to terminal $V_{port\_Pos}$, a first end of $R_{ac}$ and a first end of first twisted pair 30. A second end of $R_{ac}$ is connected to a second end of AC signal source 55. The control input of AC signal source 55 is connected to control circuit 40 via control means 90. The control input of detection source $I_{detect}$ is connected to an output of control circuit 40 via control means 70. The gate of electronically controlled switch $SW_1$ is connected to an output of control circuit 40 via control means 60. The negative output of power source PS is connected to ground, a second end of $C_{in}$ and a first end of $R_{sense}$. A second end of $R_{sense}$ is connected to an input of control circuit 40 and to the drain of $SW_1$. The source of $SW_1$ is connected to a first end of detection source $I_{detect}$, to the second end of $Z_{out}$ via terminal $V_{port\_Neg}$, a second end of $C_{out}$ and a first end of second twisted pair 35. The return of detection source $I_{detect}$ is connected to ground. A second end of first twisted pair 30 is connected to a first end of $Z_{load}$ and a first end of $C_{load}$. A second end of $Z_{load}$ and a second end of $C_{load}$ are connected to a second end of second twisted pair 35.

In operation control circuit 40 operates detection source $I_{detect}$ through control means 70 to generate a plurality of current levels. The plurality of current levels flow through $Z_{load}$, if connected, thereby presenting a plurality of voltages sensed at sensing input 80. After detection and classification of a valid PD 10, control circuit 40 connects power from power source PS over first and second twisted pairs 30,35 by the operation of electronically controlled switch $SW_1$ via control means 60. AC signal source 55, operated via control means 90, supplies an AC MPS which is sensed at sensing input 80. Among other functions, unidirectional current means $D_1$ prevents the attenuation of the output of AC signal source 55 by blocking a connection to power source PS. Upon detection of the absence of a valid MPS, control circuit 40 operates control means 60 to open electronically controlled switch $SW_1$ thereby disabling power to the port.

FIG. 1C illustrates an embodiment of a complete POE system comprising a plurality of PSEs and PDs, in which one PSE unit is inadvertently connected in error to a second PSE unit. The system of FIG. 1C comprises a first ganged power insertion equipment 95 comprising a first plurality of PSE 5, and a second ganged power insertion equipment 95 comprising a second plurality of PSE 5. First ganged power insertion equipment 95 is connected to a power source PS. A first PSE 5 of first ganged power insertion equipment 95 is connected over twisted pair cabling 30, 35 to a first PSE 5 of second ganged power insertion equipment 95. Such a connection is improper, however in the realities of crowded wiring closets such a connection does sometimes occur. Each of the remaining PSEs 5 of both first and second ganged power insertion equipment 95 are connected to a respective PD 10. It is to be noted that second ganged power insertion equipment 95 is not connected to a power source, and thus each PSE 5 of second ganged power insertion equipment 95 should not be operative to supply power to an associated PD 10.

In operation, first PSE 5 of first ganged power insertion equipment 95 operates to attempt to detect a valid PD signature resistance. Referring to FIG. 1A, it will be noted that a momentary DC path is presented across the output port of first PSE 5 of second ganged power insertion equipment 95 comprising $R_{ac}$, $C_{in}$, $R_{sense}$ and the parasitic diode of $SW_1$. Referring to FIG. 1B, it will be noted that a momentary DC path is presented by first PSE 5 of second ganged power insertion equipment 95 comprising $R_{ac}$, AC signal source 55, $R_{sense}$ and the inherent diode of $SW_1$. It is to be understood that once $C_{in}$ charges up this path is no longer seen, however detection may be accomplished prior to the completion of the charging of $C_{in}$. Furthermore, a legacy detection as described above may detect $C_{in}$ as a valid signature through the above mentioned paths.

In the event that first PSE 5 of first ganged power insertion equipment 95 detects first PSE 5 of second ganged power insertion equipment 95 as a valid device to be powered, first PSE 5 of first ganged power insertion equipment 95 will apply power, typically of a nominal 48 volts, via first and second twisted pairs 30,35. The supplied power will exceed the breakdown voltage of unidirectional current means $D_1$, with a return path being provided by the inherent diode of $SW_1$. A voltage will thus be applied across $C_{in}$ of first PSE 5 of second ganged power insertion equipment 95 and will be detected by all other PSEs 5 in second ganged power insertion equipment 95. Control circuit 40 (not shown) of all other PSEs 5 in second ganged power insertion equipment 95 will then begin to function to detect and power their associated PD 10. Such an operation will result in the possible burnout of $D_1$ of first PSE 5 of second ganged power insertion equipment 95, and may further lead to a burnout of switch $SW_1$ of first PSE 5 of second ganged power insertion equipment 95.

What is needed, and not supplied by the prior art, is a means from preventing detection of a POE controller by another POE controller improperly connected thereto.

SUMMARY OF THE INVENTION

Accordingly, it is a principal object of the present invention to overcome the disadvantages of prior art. This is provided in the present invention by providing a normally open switch in an impedance populated path present across the output port. The switch is closed only in the event that input voltage has been detected by the control circuit. Thus, in the absence of a connected power source, the detection path described above is not present thereby preventing unwanted detection of a POE controller by another POE controller. In an exemplary embodiment the impedance populated path is associated with a non-uniform signal source. In another exemplary embodiment the impedance populated path presents an impedance to a powered device detection mechanism connected over structured cabling to the output port of less than 35 Kohm in the absence of a power source connected to the power receiving terminals.

The invention provides for a power over Ethernet controller comprising: a power input; an output port; a control circuit comprising a means for sensing that a voltage component of power received at the power input is above a pre-determined threshold; and a means for switchably operatively connecting an impedance across the output port, the means for switchably operatively connecting being responsive to the control circuit; the control circuit being operative responsive to an output of the means for sensing indicative that the received power is above the pre-determined threshold to operatively connect the impedance across the output port via the operation of the means for switchably operatively connecting; the impedance not presenting an impedance populated path across the output port in the absence of the indicative output.

Preferably the impedance populated path is a momentary impedance populated path. In one embodiment the impedance is associated with a non-uniform signal source. In one further embodiment the non-uniform signal source is constituted of a current source, the impedance being operatively connected in parallel to the current source. In another further embodiment the non-uniform signal source is operatively connected in series with the impedance. In yet another further embodiment the non-uniform signal source is operable by the control circuit to generated an AC maintain power signature.

In one embodiment the power over Ethernet controller further comprises an non-uniform signal source, the impedance being associated with the non-uniform signal source. Preferably the non-uniform signal source is substantially a sine wave source.

In one embodiment the means for sensing is operative to initialize a power on reset of the control circuit. In another embodiment the means for sensing comprises at least one voltage regulator exhibiting a regulated voltage output, the means for sensing being responsive to the regulated voltage output. In yet another embodiment the means for sensing comprises at least one voltage regulator exhibiting at least one regulated voltage output and a signal indicative that the at least one voltage output is within a specified range, the means for sensing being responsive to the indicative signal. In yet another embodiment the impedance is between 15 Kohm and 35 Kohm. In yet another embodiment the control circuit is further operative to detect an AC component of a maintain power signature in the event that the impedance is connected. In yet another embodiment the impedance populated path is a momentary impedance populated path detectable as a valid powered device.

The invention independently provides for a method for preventing powering of a power over Ethernet controller via the output port, the method comprising: sensing that a voltage component of power received at a power input is above a pre-determined threshold; in the event that the voltage component is above the pre-determined threshold, connecting an impedance associated with a non-uniform signal source to the output port, the impedance when connected presenting a path across the output port; and in the event that the voltage component is not above the pre-determined threshold, disconnecting the impedance from operatively appearing across the output port.

In one embodiment the stage of connecting the impedance enables detection of an AC component of a maintain power signature. In another embodiment the impedance is a momentary impedance of an order detectable as a valid powered device.

The invention independently provides for power sourcing equipment comprising: a power input; an output port; a control circuit comprising a means for sensing that a voltage component of power received at the power input is above a pre-determined threshold; a non-uniform signal source; an impedance associated with the non-uniform signal source; and an electronically controlled switch responsive to the control circuit, the electronically controlled switch being arranged to switchably operatively connect the impedance to at least momentarily be seen across the output port; the control circuit being operative responsive to an output of the means for sensing to operatively connect the impedance via the operation of the electronically controlled switch; the electronically controlled switch being operative to disconnect the impedance from being seen across the output port in the absence of the indicative output.

In one embodiment the non-uniform signal source is constituted of a current source, the impedance being operatively connected in parallel to the current source. Preferably the impedance is between 15 Kohn and 30 Kohm.

In one embodiment the non-uniform signal source is operatively connected in series with the impedance. In another embodiment the means for sensing comprises at least one voltage regulator exhibiting a regulated voltage output, the means for sensing being responsive to the regulated voltage output. In yet another embodiment the means for sensing comprises at least one voltage regulator exhibiting at least one regulated voltage output and a signal indicative that the at least one voltage output is within a specified range, the means for sensing being responsive to the indicative signal.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1A illustrates a high level schematic diagram of a first embodiment of a POE system arranged to monitor an AC MPS component via a non-uniform current source for disconnection of a powered device according to the prior art;

FIG. 4 illustrates a high level flow chart of an embodiment of the operation of the control circuit of the POE controller of FIGS. 2A-2B in accordance with the principle of the invention to prevent unwanted detection.

DETAILED DESCRIPTION OF PREFERRED EMBODIMENTS

Figure 1B:
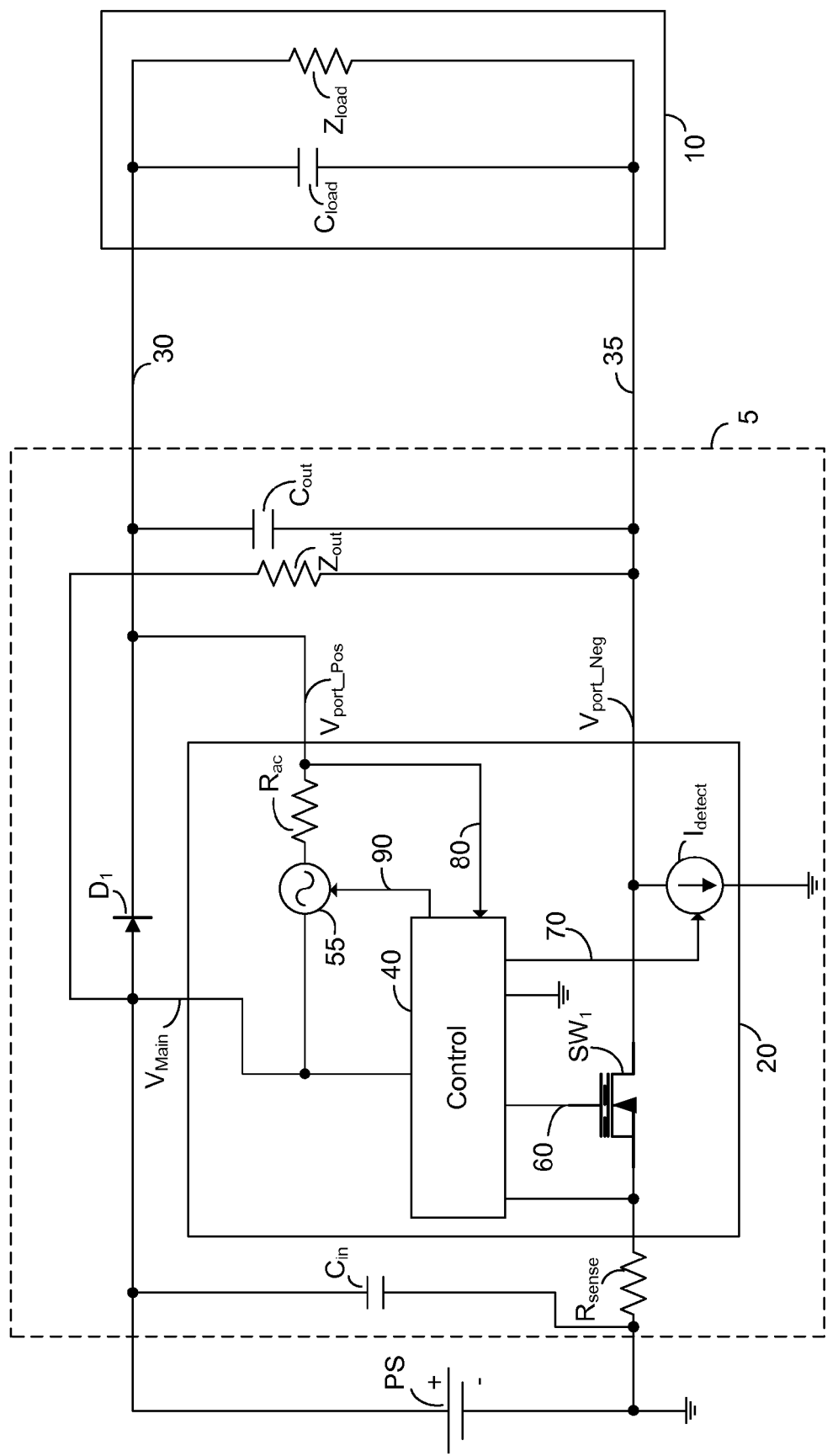
FIG. 1B illustrates a high level schematic diagram of a second embodiment of a POE system arranged to monitor an AC MPS component via a non-uniform voltage source for disconnection of a powered device according to the prior art.

The present embodiments enable a means for preventing detection of a POE controller by another POE controller improperly connected thereto. This is provided in the present invention by providing a normally open switch in an impedance populated path present across the output port. In an exemplary embodiment the impedance populated path is associated with a non-uniform or AC signal source. The switch is closed only in the event that an appropriate input voltage, or a derivative thereof, has been detected by the control circuit. Thus, in the absence of a connected power source, the impedance populated path described above is disabled thereby preventing unwanted detection of a POE controller by another POE controller.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1C:
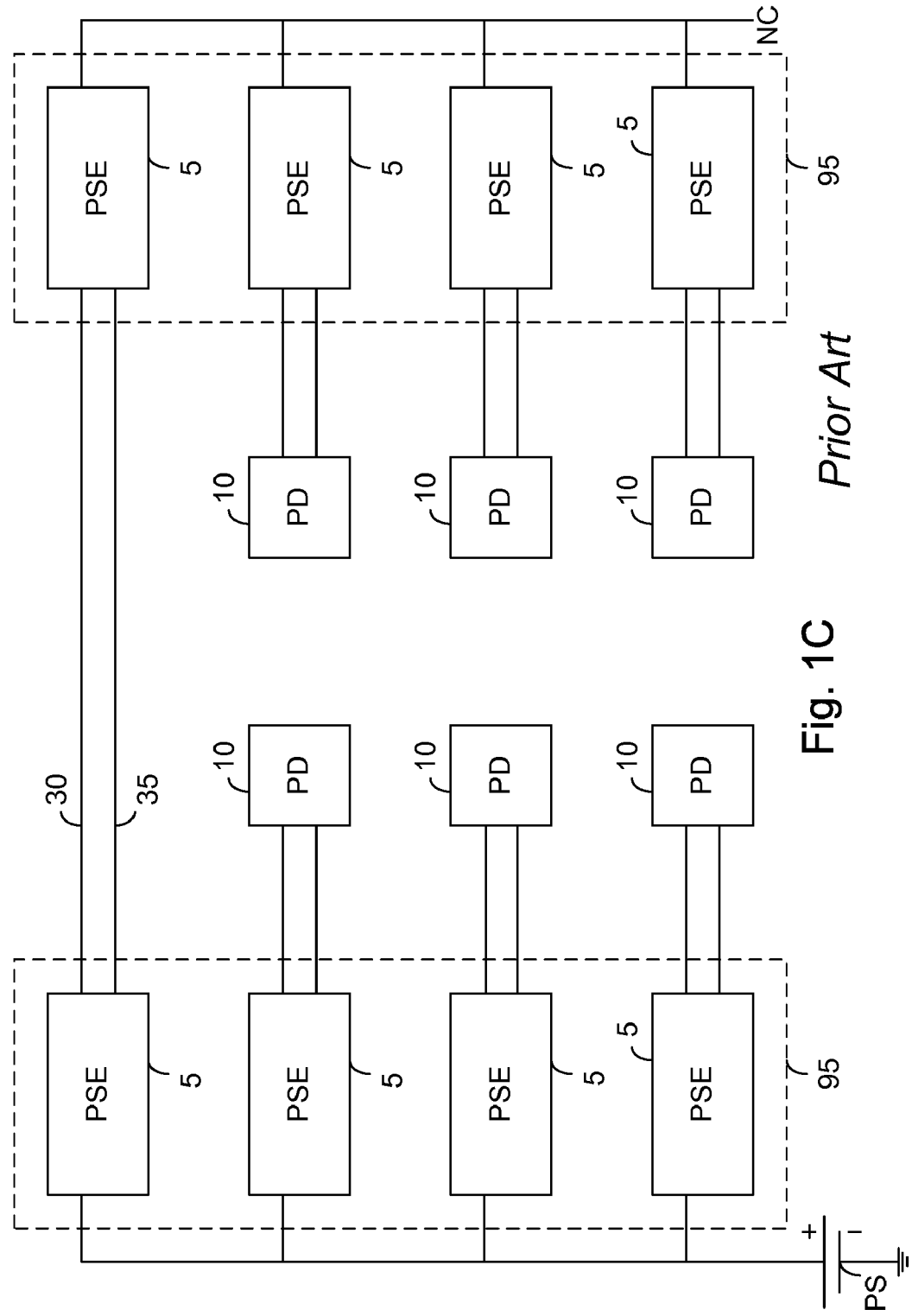
FIG. 1C illustrates an embodiment of a complete POE system comprising a plurality of PSEs and PDs, in which one PSE unit is connected in error to a second PSE unit.
Figure 2A:
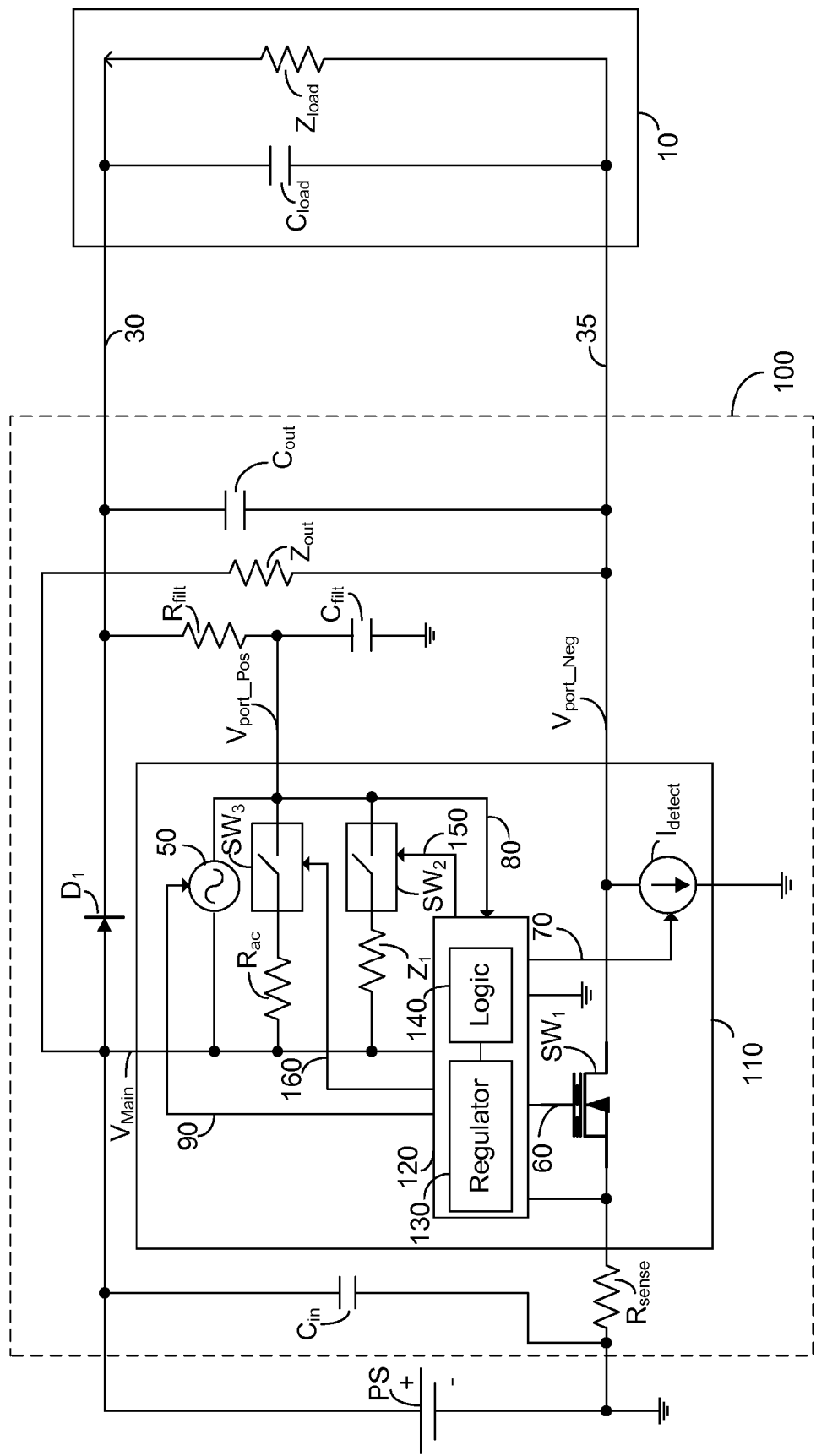
FIG. 2A is a high level schematic diagram of a first embodiment of a POE controller arranged to monitor an AC MPS component for disconnection of a powered device via a non-uniform current source, the POE controller preventing unwanted detection, in accordance with the principle of the invention, when connected as described in relation to FIG. 1C.

FIG. 2A is a high level schematic diagram of a first embodiment of a POE controller arranged to monitor an AC MPS component for disconnection of a powered device via a non-uniform current source, the POE controller preventing unwanted detection, in accordance with the principle of the invention, when connected as described in relation to FIG. 1C. The system of FIG. 2A comprises a PSE 100; a power source PS; a first twisted pair 30; a second twisted pair 35; and a PD 10. PSE 100 comprises a POE controller 110; a sense resistor $R_{sense}$; an input capacitor $C_{in}$; a unidirectional current means $D_1$; an output impendence $Z_{out}$; an output capacitor $C_{out}$; a filtering resistor $R_{filt}$; and a filtering capacitor $C_{filt}$. POE controller 110 exhibits an output port appearing between terminals designated $V_{port\_Pos}$ and $V_{port\_Neg}$ and comprises: a control circuit 120 comprising a voltage regulator 130 and a logic 140; an AC signal source 50; an AC signal source resistance $R_{ac}$; an electronically controlled switch $SW_1$; a detection source $I_{detect}$; a control means 60; a control means 70; a sensing input 80; a control means 90; a bypass path switch $SW_2$; a bypass path impedance $Z_1$; a bypass control means 150; an AC signal source path switch $SW3$; and an AC signal source path control means 160. PD 10 comprises $C_{load}$ and $Z_{load}$.

Electronically controlled switch $SW_1$ is illustrated as a power MOSFET, however this is not meant to be limiting in any way. $SW_1$ may be implemented as a FET or bipolar transistor without exceeding the scope of the invention. Detection source $I_{detect}$ is illustrated as being a variable current source, however this is not meant to be limiting in any way. Detection source $I_{detect}$ may be implemented as a voltage source or as a plurality of current sources without exceeding the scope of the invention. Twisted pairs 30 and 35 form part of a single structured communication cabling. $C_{load}$ and $Z_{load}$ schematically represent the input capacitance and load, respectively, of PD 10 which is to be detected and powered by PSE 100. In an exemplary embodiment $Z_{out}$ comprises a 45.3 K resistor, $C_{out}$ comprises a 0.2 µf capacitor, $C_{in}$ comprises a capacitor on the order of 22-47 µf, $R_{filt}$ comprises a 2K resistor, $C_{filt}$ comprises a 1 nF capacitor and $R_{ac}$ comprises a 26.6K resistor. AC signal source 50 is illustrated herein as a current source, and is a particular example of a general non-uniform signal source. Unidirectional current means $D_1$ typically comprises a Zener diode with a breakdown voltage of approximately 10 volts.

Switch $SW_1$ is illustrated as being internal to POE controller 110, typically as part of a single integrated circuit; however this is not meant to be limiting in any way. Switch $SW_1$ may be implemented externally to POE controller 110 without exceeding the scope of the invention. Control means 60 may be a direct output of control circuit 120 or a circuit responsive thereto without exceeding the scope of the invention.

The positive output of power source PS is connected to the anode of unidirectional current means $D_1$, a first end of $Z_{out}$, a first end of $C_{in}$, and via a terminal designated $V_{Main}$ to the input of AC signal source 50, a first end of $R_{ac}$, a first end of $Z_1$ and control circuit 120. The cathode of unidirectional current means $D_1$ is connected to a first end of $C_{out}$, a first end of $R_{filt}$, and a first end of first twisted pair 30. A second end of $R_{filt}$ is connected to a first end of $C_{filt}$, control circuit 120 via sensing input 80 connected to terminal $V_{port\_Pos}$, a first input of AC signal source path switch $SW_3$, a first input of bypass path switch $SW_2$ and the output of AC signal source 50. A second end of $C_{filt}$ is connected to ground. A second end of AC signal source path switch $SW_3$ is connected to a second end of $R_{ac}$, and a second end of bypass path switch $SW_2$ is connected to a second end of $Z_1$. The control input of AC signal source 50 is operatively connected to control circuit 120 via control means 90. The control input of bypass path switch $SW_2$ is operatively connected to control circuit 120 via bypass control means 150, and the control input of AC signal source path switch $SW_3$ is operatively connected to control circuit 120 via AC signal source path control means 160. The control input of detection source $I_{detect}$ is operatively connected to an output of control circuit 120 via control means 70. The gate of electronically controlled switch $SW_1$ is operatively connected to an output of control circuit 120 via control means 60. The negative output of power source PS is connected to ground, a second end of $C_{in}$ and a first end of $R_{sense}$. A second end of $R_{sense}$ is connected to an input of control circuit 120 and to the drain of $SW_1$. The source of $SW_1$ is connected to a first end of detection source $I_{detect}$, to a second end of $Z_{out}$, a second end of $C_{out}$ and a first end of second twisted pair 35 at a terminal designated $V_{port\_Neg}$. The return of detection source $I_{detect}$ is connected to ground. A second end of first twisted pair 30 is connected to a first end of $Z_{load}$ and a first end of $C_{load}$. A second end of $Z_{load}$ and a second end of $C_{load}$ are connected to a second end of second twisted pair 35.

In operation voltage regulator 130 of control circuit 120 is operative to regulate voltage for the functioning of control circuit 120, and in an exemplary embodiment provides a power good signal when all voltages are within acceptable ranges. In one embodiment a plurality of voltages are provided by voltage regulator 130 from the voltage supplied via $V_{Main}$, the power good signal being positive only when the plurality of voltages are each with a pre-determined range or tolerance. The output of voltage regulator 130 is a function of the input voltage, and thus the power good signal is indicative that the voltage supplied via $V_{Main}$ is above a pre-determined threshold. Preferably, the power good signal is operative to enable a power on reset of logic 140. Logic 140 of control circuit 120 is operative to control the flow of power to PD 10 via the operation of control means 60; to sense the AC MPS; and to operate bypass path switch $SW_2$ and AC signal source path switch $SW_3$ as will be explained further hereinto below. The combination of $R_{filt}$ and $C_{filt}$ filters the sensed AC MPS.

Control circuit 120 operates in all respects similarly to that of control circuit 40 of FIG. 1A with the exception of the operation of the bypass path comprising bypass path switch $SW_2$ and bypass path impedance $Z_1$, and the operation of AC signal source path switch $SW_3$ to disable the impedance populated path presented via $R_{ac}$.

In an exemplary embodiment bypass path impedance $Z_1$ comprises a 2K resistor and bypass path switch $SW_2$ comprises an FET. Prior to, or contemporaneously with the opening of switch $SW_1$, bypass path switch $SW_2$ is closed thereby providing a bypass path around unidirectional current means $D_1$. The bypass path ensures that voltage at the input to control circuit 120 does not exceed the rated voltage as the combination of $Z_{out}$ and bypass path impedance $Z_1$ provides a discharge path for $C_{out}$. Early discharge of $C_{out}$ is further advantageous to enable early detection of a newly connected valid PD 10.

Bypass path switch $SW_2$ may remain closed until operation of detection source $I_{detect}$ is desired. Preferably, bypass path switch $SW_2$ is closed only during the period that $SW_1$ is open and detection source $I_{detect}$ is not operational. In an exemplary embodiment, AC signal source 50 is operational whenever $SW_1$ is closed.

Table I illustrates an exemplary embodiment of the logic of operation of control means 120 to operate bypass path switch $SW_2$.

TABLE I

| Control Means 60 ($SW_1$) | Control means 70 ($I_{detect}$) | Bypass Path Control Means 120 ($SW_2$) |
|---|---|---|
| Enable | Off | Disable |
| Enable | Active | Disable |
| Disable | Off | Enable |
| Disable | Active | Disable |

It is to be noted that the above table may implemented in a NOR gate. It is further noted that the condition of the second line, namely control means 60 is enabled and control means 70 is active, is not a normal operational condition and may contraindicated.

AC signal source path switch $SW_3$ is operable to disable the impedance populated path present across the output port represented by $V_{port\_Pos}$ and $V_{port\_Neg}$. In an exemplary embodiment, the impedance populated path is associated with AC signal source 50 used for generating the AC MPS. It is to be noted that in an exemplary embodiment $R_{ac}$ is similar in value to the signature resistance of a valid PD of the above mentioned standard. In response to voltage regulator 130 indicating that all regulated voltages are within a specified range, logic 140 of control circuit 120 closes AC signal source path switch $SW_3$ via AC signal source path control means 160. Control circuit 120 operates AC signal source 50 via control means 90 in the event that an AC MPS is to be monitored. In the absence of voltage regulator 130 indicating that all regulated voltages are within the specified range, such as when the associated power source PS is not connected, AC signal source path switch $SW_3$ remains in the normally open position. Thus, the impedance populated path for detection presented to another PSE 5 of FIG. 1C is not present. In the absence of a valid detection, improper powering as described above in relation to FIG. 1C does not occur.

Figure 2B:
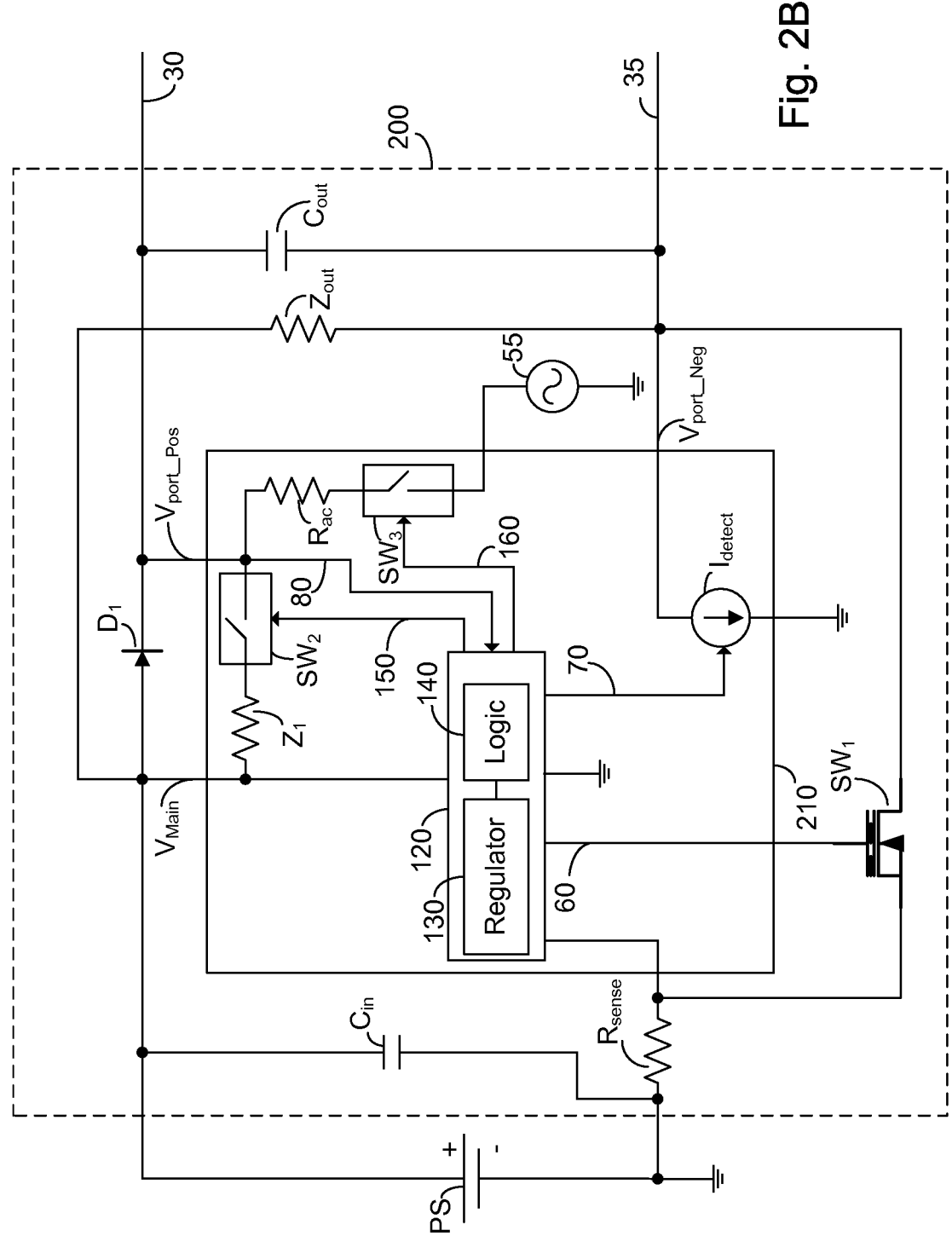
FIG. 2B is a high level schematic diagram of a second embodiment of a POE controller arranged to monitor an AC MPS component for disconnection of a powered device via a non-uniform voltage source, the POE controller preventing unwanted detection, in accordance with the principle of the invention, when connected as described in relation to FIG. 1C.

FIG. 2B is a high level schematic diagram of a second embodiment of a POE controller arranged to monitor an AC MPS component for disconnection of a powered device via a non-uniform voltage source, the POE controller preventing unwanted detection, in accordance with the principle of the invention, when connected as described in relation to FIG. 1C. The POE system of FIG. 2B comprises a PSE 200, a first twisted pair 30, a second twisted pair 35, and a power source PS. A PD, such as PD 10 of FIG. 2A has been omitted for clarity. PSE 200 comprises: a POE controller 210 exhibiting an output presented between terminals designated $V_{port\_Pos}$ and $V_{port\_Neg}$; a sense resistor $R_{sense}$; a unidirectional current means $D_1$; an output impendence $Z_{out}$; an output capacitor $C_{out}$; an input capacitor $C_{in}$; a non-uniform or AC voltage source 55; and an electronically controlled switch $SW_1$. POE controller 210 comprises: a control circuit 120 comprising voltage regulator 130 and logic 140; an AC signal source resistance $R_{ac}$; a bypass path switch $SW_2$; an AC signal source path switch $SW_3$; a detection source $I_{detect}$; a control means 60; a control means 70; a sensing input 80; a bypass control means 150; and an AC signal source path control means 160.

Electronically controlled switch $SW_1$ is illustrated as a power MOSFET, however this is not meant to be limiting in any way. $SW_1$ may be implemented as a FET or bipolar transistor without exceeding the scope of the invention. Detection source $I_{detect}$ is illustrated as being a variable current source, however this is not meant to be limiting in any way. Detection source $I_{detect}$ may be implemented as a voltage source or as a plurality of current sources without exceeding the scope of the invention. Twisted pairs 30 and 35 form part of a single structured communication cabling. In an exemplary embodiment $Z_{out}$ comprises a 45.3 K resistor, $C_{out}$ comprises a 0.2 μf capacitor and $C_{in}$ comprises a capacitor on the order of 22-47 μf. AC signal source 55 is illustrated herein as a voltage source, and is a particular example of a general non-uniform signal source.

Switch $SW_1$ is illustrated as being external to POE controller 210, however this is not meant to be limiting in any way. Switch $SW_1$ may be implemented internally within POE controller 210 without exceeding the scope of the invention. Control means 60 may be a direct output of control circuit 120 or a circuit responsive thereto without exceeding the scope of the invention.

The positive output of power source PS is connected to the anode of unidirectional current means $D_1$, a first end of $C_{in}$, a first end of $Z_{out}$, and via a terminal $V_{Main}$ to a first end of $Z_1$ and control circuit 120. The cathode of unidirectional current means $D_1$ is connected to a first end of $C_{out}$, control circuit 120 via sensing input 80 connected via terminal $V_{port\_Pos}$, a first end of bypass path switch $SW_2$, a first end of AC signal source path resistance $R_{ac}$ and a first end of first twisted pair 30. A second end of $Z_1$ is connected to a second end of bypass path switch $SW_2$, and the control input of bypass path switch $SW_2$ is operatively connected to control circuit 120 via bypass control means 150. A second end of AC signal source resistance $R_{ac}$ is connected to a first end of AC signal source path switch $SW_3$; a second end of AC signal source path switch $SW_3$ is connected to the output of AC signal source 55; and the return of AC signal source 55 is connected to ground. The control input of AC signal source path switch $SW_3$ is operatively connected to control circuit 120 via AC signal source path control means 160. The control input of detection source $I_{detect}$ is operatively connected to an output of control circuit 120 via control means 70. The gate of electronically controlled switch $SW_1$ is operatively connected to an output of control circuit 120 via control means 60. The negative output of power source PS is connected to ground, a second end of $C_{in}$ and a first end of $R_{sense}$. A second end of $R_{sense}$ is operatively connected to an input of control circuit 120 and to the drain of $SW_1$. The source of $SW_1$ is connected to one end of detection source $I_{detect}$ via terminal $V_{port\_Neg}$, to a second end of $Z_{out}$, a second end of $C_{out}$ and a first end of second twisted pair 35. The return of detection source $I_{detect}$ is connected to ground.

In operation voltage regulator 130 of control circuit 120 is operative to regulate the voltage for the functioning of control circuit 120, and in an exemplary embodiment provides a power good signal when all voltages are within acceptable ranges. In one embodiment a plurality of voltages are provided by voltage regulator 130 from the voltage supplied via $V_{Main}$, the power good signal being positive only when the plurality of voltages are each with a pre-determined range or tolerance. The output of voltage regulator 130 is a function of the input voltage, and thus the power good signal is indicative that the voltage supplied via $V_{Main}$ is above a pre-determined threshold. Preferably, the power good signal is operative to enable a power on reset of logic 140. Logic 140 of control circuit 120 is operative to control the flow of power to PD 10 (not shown) via the operation of control means 60, to sense the AC MPS and operate bypass path switch $SW_2$ and AC signal source path switch $SW_3$ as will be explained further hereinto below.

Control circuit 120 operates in all respects similarly to that of control circuit 40 of FIG. 1B with the exception of the operation of the bypass path comprising bypass path switch $SW_2$ and bypass path impedance $Z_1$, and the operation of AC signal source path switch $SW_3$ to disable the impedance populated path present across the output port represented by $V_{port\_Pos}$ and $V_{port\_Neg}$.

In an exemplary embodiment bypass path impedance $Z_1$ comprises a 2K resistor and bypass path switch $SW_2$ comprises an FET. Prior to, or contemporaneously with the opening of switch $SW_1$, bypass path switch $SW_2$ is closed thereby providing a bypass path around unidirectional current means $D_1$. The bypass path ensures that voltage at the input to control circuit 110 does not exceed the rated voltage as the combination of $Z_{out}$ and bypass path impedance $Z_1$ provides a discharge path for $C_{out}$. Early discharge of $C_{out}$ is further advantageous to enable early detection of a newly connected valid PD.

Bypass switch $SW_2$ may remain closed until operation of detection source $I_{detect}$ is desired. Preferably, bypass path switch $SW_2$ is closed only during the period that $SW_1$ is open and detection source $I_{detect}$ is not operational. In an exemplary embodiment, AC signal source 55 is operational whenever $SW_1$ is closed via the operation of AC signal source path switch $SW_3$.

Table II illustrates an exemplary embodiment of the logic of operation of control means 120 to operate bypass path switch $SW_2$.

TABLE II

| Control Means 60 ($SW_1$) | Control means 70 ($I_{detect}$) | Bypass Path Control Means 120 ($SW_2$) |
|---|---|---|
| Enable | Off | Disable |
| Enable | Active | Disable |
| Disable | Off | Enable |
| Disable | Active | Disable |

It is to be noted that the above table may implemented in a NOR gate. It is further noted that the condition of the second line, namely control means 60 is enabled and control means 70 is active, is not a normal operational condition and may contraindicated.

AC signal source path switch $SW_3$ is operable to disable the impedance populated path presented by $R_{ac}$ across the output port represented by $V_{port\_Pos}$ and $V_{port\_Neg}$. In an exemplary embodiment AC signal source path switch $SW_3$ is constituted of a MOSFET. In an exemplary embodiment, the impedance populated path is associated with AC signal source 55 used for generating the AC MPS. In response to voltage regulator 130 indicating that regulated voltage, or voltages, are within a specified range, control circuit 120 responsive to logic 140 closes AC signal source path switch $SW_3$. In the absence of voltage regulator 130 indicating that regulated voltage, or voltages, are within the specified range, such as when the associated power source PS is not connected, AC signal source path switch $SW_3$ remains in the normally open position. Thus, the impedance populated path for detection presented to another PSE 5 of FIG. 1C is not present. In the absence of a valid detection, improper powering as described above in relation to FIG. 1C does not occur.

Figure 3:
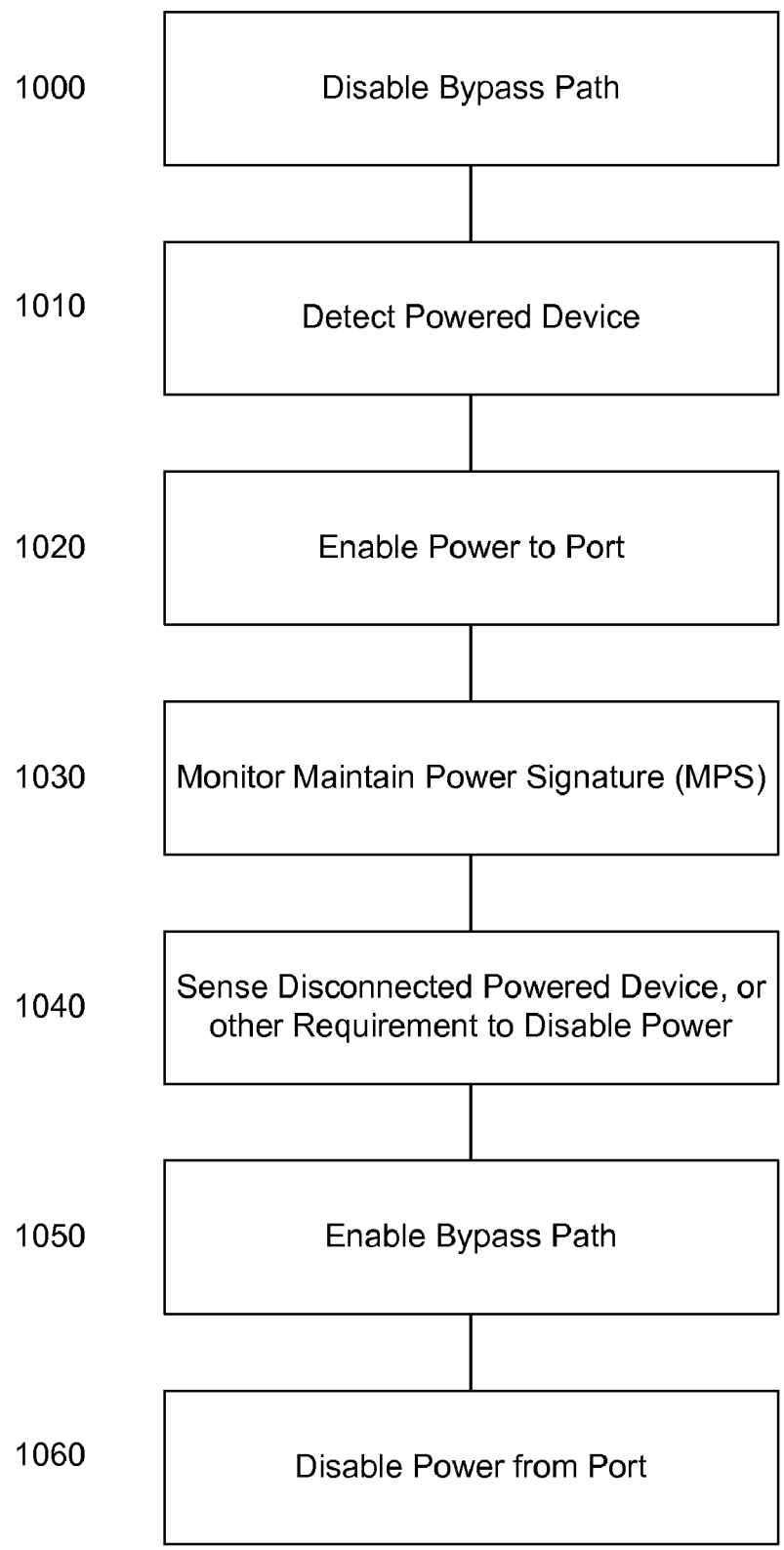
FIG. 3 illustrates a high level flow chart of an embodiment of the operation of the control circuit of the POE controller of FIGS. 2A-2B in accordance with the principle of the invention to enable a bypass path.

FIG. 3 illustrates a high level flow chart of an embodiment of the operation of control circuit 120 of the respective power over Ethernet controller 110, 210 of FIGS. 2A-2B in accordance with the principle of the invention. In stage 1000 a bypass path is disabled. In an exemplary embodiment the bypass path comprises bypass path switch $SW_2$ and bypass path impedance $Z_1$, and is disabled via bypass control means 150. In stage 1010 a valid powered device is detected. In an exemplary embodiment this is accomplished via detection source $I_{detect}$ operated through control means 70. It is to be noted that the bypass path is disabled in stage 1000 to improve the operation of the detection circuit, and in some embodiments may not be required. In stage 1020 power is enabled to the port. In an exemplary embodiment this is accomplished by enabling switch $SW_1$ via control means 60.

In stage 1030 an MPS is monitored. In an exemplary embodiment in which an AC source is used as described above in relation to FIG. 2A this is accomplished by closing AC signal source path switch $SW_3$ via AC signal source path control means 160, enabling AC source 50 through control means 90 and monitoring the resultant AC voltage through sense input 80. In the embodiment of FIG. 2B this is accomplished by closing AC signal source path switch $SW_3$ via AC signal source path control means 160, and monitoring the resultant AC voltage through sense input 80.

In stage 1040 a disconnected port is sensed, or a disconnect port command is received. In an exemplary embodiment a disconnected port is sensed as a result of the monitored MPS of stage 1030, in particular the lack of one or more of an AC and DC MPS. A disconnect port command may be received due to a shortage of power, a loss of power, or the connection and detection of a valid powered device having a higher priority than the priority of the current port.

In stage 1050 a bypass path is enabled bypassing unidirectional current means $D_1$. In an exemplary embodiment this is accomplished by enabling bypass path switch $SW_2$ via bypass control means 150. In stage 1060 power is disabled to the port. In an exemplary embodiment this is accomplished by disabling, or opening, switch $SW_1$ via control means 60. It is to be understood that stage 1050 may be accomplished before, contemporaneously with or immediately after stage 1060 without exceeding the scope of the invention. In an exemplary embodiment, as described above in relation to Table I and Table II, the operation of control means 60 and 70 are gated to bypass control means 150.

FIG. 4 illustrates a high level flow chart of an embodiment of the operation of control circuit 120 of respective POE controllers 110, 210 of FIGS. 2A-2B in accordance with the principle of the invention to prevent unwanted detection. In stage 2000 a switch associated with the impedance populated path appearing across the output is kept normally open. Thus, no impedance populated path to enable detection is present. In an exemplary embodiment, the impedance populated path is associated with the non-uniform signal source, such as AC signal source resistance $R_{ac}$ of FIGS. 2A, 2B.

In stage 2010 power on is confirmed by the output of voltage regulator 130. In one embodiment a plurality of voltages are provided by voltage regulator 130 from the voltage supplied via $V_{Main}$, the power good signal being positive only when the plurality of voltages are each with a pre-determined range or tolerance. The output of voltage regulator 130 is a function of the input voltage, and thus the power good signal is indicative that the voltage supplied from power source PS is above a pre-determined threshold. In a preferred embodiment, the output of all voltage regulators are logically ANDed together to ensure that operation of stage 2020 occurs only when the output of all power regulators are within a specified range. In stage 2020 the impedance populated path is enabled by closing AC signal source path switch $SW_3$. Advantageously, the impedance populated path closed by signal source path switch $SW_3$ is thus enabled only after power from power source PS associated with PSE 100, 200 of FIGS. 2A, 2B is confirmed. It is to be understood by those skilled in the art that in the presence of operative power from power source PS, detection of PSE 200 by another PSE can not occur due to the presence of operating voltage from power source PS.

In stage 2030, the non-uniform signal source is enabled. In the embodiment of FIG. 2A this is accomplished by the operation of control means 90. In the embodiment of FIG. 2B this is an inherent result of closing signal source path switch $SW_3$.

Thus, the present embodiments enable a means for preventing detection of a POE controller by another POE controller improperly connected thereto. This is provided in the present invention by providing a normally open switch in the impedance populated path presented across the output port. In an exemplary embodiment the impedance populated path is associated with an AC or other non-uniform signal source. The switch is closed only in the event that input voltage has been detected by the control circuit. Thus, in the absence of a connected power source, the detection path described above is not present thereby preventing unwanted detection of a POE controller by another POE controller.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A power over Ethernet controller comprising:
   a power input;
   an output port;
   a control circuit comprising a means for sensing that a voltage component of power received at said power input is above a pre-determined threshold; and
   a means for switchably operatively connecting an impedance across said output port, said means for switchably operatively connecting responsive to said control circuit;
   said control circuit operative responsive to an output of said means for sensing indicative that the received power is above the pre-determined threshold to operatively connect said impedance across said output port via the operation of said means for switchably operatively connecting;
   said impedance not presenting an impedance populated path across said output port in the absence of said output of said means for sensing indicative that the received power is above the pre-determined threshold.

2. A power over Ethernet controller according to claim 1, wherein said impedance populated path is a momentary impedance populated path.

3. A power over Ethernet controller according to claim 1, wherein said impedance is associated with a non-uniform signal source.

4. A power over Ethernet controller according to claim 3, wherein said non-uniform signal source is constituted of a current source, said impedance being operatively connected in parallel to said current source.

5. A power over Ethernet controller according to claim 3, wherein said non-uniform signal source is operatively connected in series with said impedance.

6. A power over Ethernet controller according to claim 3, wherein said non-uniform signal source is operable by said control circuit to generate an AC maintain power signature.

7. A power over Ethernet controller according to claim 1, further comprising an non-uniform signal source, said impedance being associated with said non-uniform signal source.

8. A power over Ethernet controller according to claim 7, wherein said non-uniform signal source is substantially a sine wave source.

9. A power over Ethernet controller according to claim 1, wherein said means for sensing is operative to initialize a power on reset of said control circuit.

10. A power over Ethernet controller according to claim 1, wherein said means for sensing comprises at least one voltage regulator exhibiting a regulated voltage output, said means for sensing being responsive to said regulated voltage output.

11. A power over Ethernet controller according to claim 1, wherein said means for sensing comprises at least one voltage regulator exhibiting at least one regulated voltage output and a signal indicative that said at least one regulated voltage output is within a specified range, said means for sensing responsive to said signal indicative that said at least one regulated voltage output is within the specified range.

12. A power over Ethernet controller according to claim 1, wherein said impedance is between 15 Kohm and 35 Kohm.

13. A power over Ethernet controller according to claim 1, wherein said control circuit is further operative to detect an AC component of a maintain power signature in the event that said impedance is connected.

14. A power over Ethernet controller according to claim 1, wherein said impedance populated path is a momentary impedance populated path detectable as a valid powered device.

15. A method for preventing powering of a first power over Ethernet controller via an output port of a second power over Ethernet controller, the method comprising:
   sensing that a voltage component of power received at a power input of the first power over Ethernet controller is above a pre-determined threshold;
   in the event that said voltage component is above said pre-determined threshold, connecting an impedance associated with a non-uniform signal source to said output port of the first power over Ethernet controller, said impedance when connected presenting a path across said output port of the first power over Ethernet controller; and
   in the event that said voltage component is not above said pre-determined threshold, disconnecting said impedance from operatively appearing across said output port of the first power over Ethernet controller.

16. A method according to claim 15, wherein connecting said impedance enables detection of an AC component of a maintain power signature.

17. A method according to claim 15, wherein said impedance is a momentary impedance of an order detectable as a valid powered device.

18. Power sourcing equipment comprising:
   a power input;
   an output port;
   a control circuit comprising a means for sensing that a voltage component of power received at said power input is above a pre-determined threshold;
   a non-uniform signal source;
   an impedance associated with said non-uniform signal source; and
   an electronically controlled switch responsive to said control circuit, said electronically controlled switch arranged to switchably operatively connect said impedance to at least momentarily be seen across said output port;
   said control circuit operative responsive to an output of said means for sensing indicative that the voltage component of power received at said power input is above the pre-determined threshold to operatively connect said impedance via the operation of said electronically controlled switch;
   said electronically controlled switch being operative to disconnect said impedance from being seen across said output port in the absence of said output of said means for sensing indicative that the voltage component of power received at said power input is above the pre-determined threshold.

19. Power sourcing equipment according to claim 18, wherein said non-uniform signal source is constituted of a current source, said impedance being operatively connected in parallel to said current source.

20. Power sourcing equipment according to claim 19, wherein said impedance is between 15 Kohn and 30 Kohm.

21. Power sourcing equipment according to claim 18, wherein said non-uniform signal source is operatively connected in series with said impedance.

22. Power sourcing equipment according to claim 18, wherein said means for sensing comprises at least one voltage regulator exhibiting a regulated voltage output, said means for sensing being responsive to said regulated voltage output.

23. Power sourcing equipment according to claim 18, wherein said means for sensing comprises at least one voltage regulator exhibiting at least one regulated voltage output and a signal indicative that said at least one regulated voltage output is within a specified range, said means for sensing responsive to said signal indicative that said at least one regulated voltage output is within the specified range.

* * * * *